(12) United States Patent
Kumar et al.

(10) Patent No.: US 7,033,412 B2
(45) Date of Patent: Apr. 25, 2006

(54) EXHAUST GAS TREATMENT DEVICE AND METHOD FOR MAKING THE SAME

(75) Inventors: Amit Kumar, Amherst, NY (US); John D. Ten Eyck, Lewiston, NY (US); Thomas Lacki, Alden, NY (US)

(73) Assignee: Unifrax Corporation, Niagara Falls, NY (US)

( * ) Notice: Subject to any disclaimer, the term of this patent is extended or adjusted under 35 U.S.C. 154(b) by 249 days.

(21) Appl. No.: 10/669,225

(22) Filed: Sep. 24, 2003

(65) Prior Publication Data

US 2004/0134172 A1   Jul. 15, 2004

Related U.S. Application Data

(60) Provisional application No. 60/414,721, filed on Sep. 30, 2002.

(51) Int. Cl.
*B01D 35/30* (2006.01)
*B01D 46/00* (2006.01)

(52) U.S. Cl. .................. 55/523; 55/DIG. 30; 422/179; 422/221

(58) Field of Classification Search .................. 55/523, 55/DIG. 30; 60/299, 301, 311; 422/177, 422/179, 221, 222
See application file for complete search history.

(56) References Cited

U.S. PATENT DOCUMENTS

| | | |
|---|---|---|
| 2,624,658 A | 1/1953 | Parker et al. |
| 3,227,241 A | 1/1966 | Mattoon |
| 3,458,329 A | 7/1969 | Owens et al. |
| 3,771,967 A | 11/1973 | Nowak |
| 3,795,524 A | 3/1974 | Sowman |
| 3,798,006 A | 3/1974 | Balluff |
| 3,861,881 A | 1/1975 | Nowak |
| 3,876,384 A | 4/1975 | Satiago et al. |
| 3,891,396 A | 6/1975 | Musall et al. |

(Continued)

FOREIGN PATENT DOCUMENTS

CA   1037973   9/1978

(Continued)

OTHER PUBLICATIONS

Gulati, Ten Eyck, & Lebold, Durable Pakaging Design for Cordierite Ceramic Catalysts for Motorcycle Application, Mar. 1, 1993, Society of Automotive Engineers Meeting, Detroit, MI.

(Continued)

*Primary Examiner*—Robert A. Hopkins
(74) *Attorney, Agent, or Firm*—Curatolo Sidoti Co., L.P.A.; Joseph G. Curatolo; Salvatore A. Sidoti

(57) ABSTRACT

A device (10) for treatment of exhaust gases includes a housing (12); a fragile structure (18) resiliently mounted within the housing (12); and a non-intumescent mounting mat (20) disposed in a gap between the housing (12) and the fragile structure (18). The mounting mat (20) comprises melt-formed, leached glass fibers high in silica content and exerts a minimum holding pressure for holding the fragile structure (18) within the housing (12) of one of (i) at least 10 kPa after 1000 cycles of testing at a hot face temperature of 900° C., a gap bulk density of between 0.3 and 0.5 g/cm³, and a percent gap expansion of 5 percent, and (ii) at least 50 kPa after 1000 cycles of testing at a hot face temperature of 300° C., a gap bulk density of between 0.3 and 0.5 g/cm³, and a percent gap expansion of 2 percent.

22 Claims, 1 Drawing Sheet

U.S. PATENT DOCUMENTS

| | | |
|---|---|---|
| 3,916,057 A | 10/1975 | Hatch et al. |
| 3,996,145 A | 12/1976 | Hepburn |
| 4,048,363 A | 9/1977 | Langer et al. |
| 4,087,039 A | 5/1978 | Balluff |
| 4,142,864 A | 3/1979 | Rosynsky et al. |
| 4,159,205 A | 6/1979 | Miyahara et al. |
| 4,220,559 A | 9/1980 | Polinski |
| 4,239,733 A | 12/1980 | Foster et al. |
| 4,256,700 A | 3/1981 | Smith et al. |
| 4,269,807 A | 5/1981 | Bailey et al. |
| 4,277,269 A | 7/1981 | Sweeting |
| 4,279,864 A | 7/1981 | Nara et al. |
| 4,305,992 A | 12/1981 | Langer et al. |
| 4,327,145 A | 4/1982 | Mitani et al. |
| 4,328,187 A | 5/1982 | Musall et al. |
| 4,335,077 A | 6/1982 | Santiago et al. |
| 4,344,921 A | 8/1982 | Santiago et al. |
| 4,353,872 A | 10/1982 | Midorikawa |
| 4,385,135 A | 5/1983 | Langer et al. |
| 4,425,304 A | 1/1984 | Kawata et al. |
| 4,432,943 A | 2/1984 | Musall et al. |
| 4,559,862 A | 12/1985 | Case et al. |
| 4,693,338 A | 9/1987 | Clerc |
| 4,735,757 A | 4/1988 | Yamamoto et al. |
| 4,746,570 A | 5/1988 | Suzaki et al. |
| 4,752,515 A | 6/1988 | Hosoi et al. |
| 4,863,700 A | 9/1989 | Ten Eyck |
| 4,865,818 A | 9/1989 | Merry et al. |
| 4,929,429 A | 5/1990 | Merry |
| 4,999,168 A | 3/1991 | Ten Eyck |
| 5,028,397 A | 7/1991 | Merry |
| 5,032,441 A | 7/1991 | Ten Eyck et al. |
| 5,110,413 A | 5/1992 | Steer |
| 5,132,061 A | 7/1992 | Lindeman et al. |
| 5,145,811 A | 9/1992 | Lintz et al. |
| 5,151,253 A | 9/1992 | Merry et al. |
| 5,250,269 A | 10/1993 | Langer |
| 5,254,410 A | 10/1993 | Langer et al. |
| 5,290,522 A | 3/1994 | Rogers et al. |
| 5,326,633 A | 7/1994 | Clough et al. |
| 5,340,643 A | 8/1994 | Ou et al. |
| 5,376,341 A | 12/1994 | Gulati |
| 5,380,580 A | 1/1995 | Rogers et al. |
| 5,389,716 A | 2/1995 | Graves |
| 5,453,116 A | 9/1995 | Fischer et al. |
| 5,523,059 A | 6/1996 | Langer |
| 5,580,532 A | 12/1996 | Robinson et al. |
| 5,585,312 A | 12/1996 | Ten Eyck et al. |
| 5,666,726 A | 9/1997 | Robinson et al. |
| 5,686,039 A | 11/1997 | Merry |
| 5,736,109 A | 4/1998 | Howorth et al. |
| 5,853,675 A | 12/1998 | Howorth |
| 5,869,010 A | 2/1999 | Langer |
| 5,882,608 A | 3/1999 | Sanocki et al. |
| 6,051,193 A | 4/2000 | Langer et al. |
| 6,183,852 B1 | 2/2001 | Rorabaugh et al. |
| 6,224,835 B1 | 5/2001 | Langer |
| 6,231,818 B1 | 5/2001 | Ten Eyck |
| 6,245,301 B1 | 6/2001 | Stroom et al. |
| 6,365,267 B1 | 4/2002 | Langer et al. |
| 6,417,125 B1 | 7/2002 | Rorabaugh et al. |
| 6,458,418 B1 | 10/2002 | Langer et al. |
| 6,468,932 B1 | 10/2002 | Robin et al. |
| 6,613,294 B1 | 9/2003 | Sanocki et al. |
| 6,855,298 B1 * | 2/2005 | TenEyck ................ 422/179 |
| 2001/0036427 A1 | 11/2001 | Yamada et al. |
| 2002/0025750 A1 | 2/2002 | Dinwoodle |
| 2002/0025904 A1 | 2/2002 | Goto et al. |
| 2003/0165638 A1 | 9/2003 | Louks et al. |

FOREIGN PATENT DOCUMENTS

| | | |
|---|---|---|
| EP | 0 803 643 A1 | 10/1997 |
| GB | 1481133 | 7/1977 |
| GB | 1513808 | 6/1978 |
| JP | 7-286514 | 10/1995 |
| WO | WO 99/46028 | 9/1999 |

OTHER PUBLICATIONS

Marnet, Gulati, Lambert, & Zink. System Durability of a Ceramic Racetrack Converter. Oct. 1991, International Fuels and Lubricants Meeting, Toronto, Canada.

U.S. Appl. No. 09/560,469, filed Apr. 28, 2000, entitled "Support Element for Fragile Structures Such as Catalytic Coverters".

U.S. Appl. No. 09/854,836, filed May 14, 2001, entitled "Amorphous Non-Intumescent Inorganic Fiber Mat for Low Temperature Exhaust Gas Treated Devices".

English language abstract of DE 19858025; Publication Date: Jun. 21, 2000; Applicant: Aslgawo GmbH.

* cited by examiner

US 7,033,412 B2

EXHAUST GAS TREATMENT DEVICE AND METHOD FOR MAKING THE SAME

This application claims benefit of provisional application 60/414,721, filed Sep. 30, 2002.

BACKGROUND

A device for the treatment of exhaust gases is provided, such as a catalytic converter or a diesel particulate trap, that has a fragile structure mounted within a housing which is supported therein by a mounting mat disposed between the housing and the fragile structure.

A catalytic converter assembly for treating exhaust gases of an automotive or diesel engine contains a fragile structure, such as a catalyst support structure, for holding the catalyst that is used to effect the oxidation of carbon monoxide and hydrocarbons and the reduction of oxides of nitrogen. The fragile structure is mounted within a metal housing, and is preferably made of a frangible material, such as a monolithic structure formed of metal or a brittle, fireproof ceramic material such as aluminum oxide, silicon dioxide, magnesium oxide, zirconia, cordierite, silicon carbide and the like. These materials provide a skeleton type of structure with a plurality of tiny flow channels. However, as noted hereinabove, these structures can be, and oftentimes are, very fragile. In fact, these monolithic structures can be so fragile that small shockloads or stresses are often sufficient to crack or crush them.

The fragile structure is contained within a metal housing, with a space or gap between the external surface of the fragile structure and the internal surface of the housing. In order to protect the fragile structure from thermal and mechanical shock and other stresses noted above, as well as to provide thermal insulation and a gas seal, it is known to position at least one ply or layer of mounting or support material within the gap between the fragile structure and the housing. For example, assignee's U.S. Pat. Nos. 4,863,700, 4,999,168, 5,032,441, 5,580,532, 5,666,726, and 6,231,818, the disclosure of each of which is incorporated herein by reference, disclose catalytic converter devices having a mounting or support material disposed within the gap between the housing and the fragile structure contained in the devices to protect the fragile structure and otherwise hold it in place within the housing.

Presently, materials to be used in mounting mats for catalytic converters and other exhaust gas-treating devices may range from relatively inexpensive materials such as, for example, amorphous glass fibers such as S-glass, to more expensive materials such as, for example, high alumina ceramic oxide fibers. Intumescent materials as well as non-intumescent materials have been and continue to be employed in mounting mats, depending upon the application and conditions under which the mounting mats are to be used.

The type of monolithic structure to be employed as well as the application and the conditions under which the mounting mats are to be used must be determined prior to selection of the mounting mat materials. For example, one would use a high temperature resistant mounting mat material adaptable over a wide temperature range for a high temperature application such as typically found in catalytic converters, while a lower temperature resistant, resilient, flexible material may be just as or more suitable for high G load applications that use heavier substrates such as may be found in diesel catalyst structures and diesel particulate traps.

In any event, the mounting mat materials employed should be capable of satisfying any of a number of design or physical requirements set forth by the fragile structure manufacturers or the catalytic converter manufacturers. For example, a state-of-the-art ply or plies of mounting mat material, should preferably exert an effective residual holding pressure on the fragile structure, even when the catalytic converter has undergone wide temperature fluctuations, which causes significant expansion and contraction of the metal housing in relation to the fragile structure, also referred to as the catalyst support structure, which in turn causes significant compression and release cycles for the mounting mats over a period of time. The best, state-of-the-art mounting mats used in high temperature applications have been found to sufficiently hold the fragile structure in the most severe of applications where temperatures reach well above 900° C., and often undergo constant thermal cycling to room temperature.

Other mounting mats, while not requiring use in high temperature environments, must provide sufficient resiliency and flexibility to effectively hold the fragile structure with sufficient force or strength, but yet not crush the fragile structure under constant thermal cycling. Under normal operating conditions for a catalytic converter, a minimum shear strength for a mounting mat of at least 5 kPa is required to prevent the fragile structure from being dislodged and damaged. The shear strength of the mat is defined as the mat's holding pressure multiplied by the coefficient of friction of the mat/fragile structure interface. The coefficient of friction of typical mat products in catalytic converters is approximately 0.45 in the in-use condition. Therefore, a mounting mat for high temperature applications, i.e., those applications where the temperature in the catalytic converter may increase up to about 900° C. or more, should have an effective residual minimum holding pressure after 1000 cycles of testing at a hot face temperature of about 900° C. of at least about 10 kPa.

For other exhaust gas-treating devices, such as diesel particulate traps or diesel catalyst structures, it will be appreciated that while these devices do not reach the temperatures provided in high temperature catalytic converters, the weight of the fragile structure and loading techniques employed require the mounting mat utilized to have a different effective residual minimum holding pressure than that set forth above. In these applications, a higher minimum shear strength for the mounting mat of at least about 25 kPa is preferably achieved to prevent that fragile structure from being dislodged and damaged. The coefficient of friction of these mat products in such high G-load applications with heavy substrates is still approximately 0.45 in the in-use condition. Therefore, a mounting mat for this type of application should have an effective residual minimum holding pressure after 1000 cycles of testing at a temperature of about 300° C. of at least about 50 kPa.

Many mounting mats, heretofore, have attempted to overcome thermal cycling problems associated with high temperature applications by using high alumina or mullite ceramic fibers. In one known embodiment, an aqueous solution or a colloidal dispersion, often called an "organosol" or a "sol gel" is used to produce the ceramic fibers. While ceramic fibers formed by sol gel processes may offer a high degree of resiliency needed for mounting monolithic structures, the high cost of the fibers have forced manufacturers to seek other, less expensive solutions. In addition, these ceramic fibers typically have an average fiber diameter of less than 5, and in some cases, less than 3.5, microns. Thus, these fibers are respirable, i.e., capable of being breathed into the lungs.

In other instances, a fibrous mounting material may be used in combination with other materials, such as intumescent materials and backing layers, in order to provide sufficient strength for handleability, resiliency or to obtain an adequate holding pressure.

As another alternative to using sol gel-derived, ceramic fibers, attempts have been made to form refractory ceramic fibers using melt-processing techniques. Only in the last ten years or so have refractory ceramic fibers, i.e., fibers containing from about 45 to 60 percent alumina and from about 40 to about 55 percent silica, satisfied manufacturers of high temperature catalytic converters by providing mounting mats having sufficient resiliency values to meet the manufacturers' demands. Not only are mounting mats containing such refractory ceramic fibers expensive, but also they are difficult to manufacture, particularly with respect to the processing treatments they must undergo. Care must be taken to ensure that they are substantially shot free. An example of the use of refractory ceramic fibers used for mounting mats in catalytic converters and the process required to provide a sufficient product is disclosed in U.S. Pat. No. 5,250,269.

In low temperature catalytic converter applications, such as turbocharged direct injection (TDI) diesel powered vehicles, the exhaust temperature is typically about 150° C. and may never exceed 300° C. Various types of mounting mats may be used for these and other slightly higher temperature applications. For many catalytic converter applications, intumescent mats, i.e., mounting mats made from intumescent materials such as graphite or vermiculite, have been used. It has more recently been observed that mounting mats made with intumescent materials may fail for these low temperature applications.

One possible reason for this failure is that the exhaust temperature may be too low to expand the intumescent, typically vermiculite, particles sufficiently. Thus, the mats fail to provide sufficient pressure against the fragile structure and tend to fail. A second possible reason for this failure is that organic binder systems used in the intumescent mat products degrade and cause a loss in the holding pressure.

Thus, non-intumescent mat systems have been developed and are now common within the industry. These materials are suitable for use over a much wider temperature range than are the intumescent prior art mats.

Non-intumescent mat systems include substantially no intumescent materials such as graphite or vermiculite and, therefore, are substantially non-expanding. By "substantially non-expanding," it is meant that the mat does not readily expand upon the application of heat as would be expected with intumescent mats. Of course, some expansion of the mat does occur based upon its thermal coefficient of expansion, but the amount of expansion is insubstantial and de minimus as compared to the expansion of mats employing useful amounts of intumescent material. These non-intumescent mats, heretofore, have comprised high temperature resistant, inorganic fibers and, optionally, a binder. By high temperature resistant, it is meant that the fiber can have a use temperature up to about 1260° C. Depending upon the application, the temperature regime in which the mat is used, and the type of monolith employed, non-intumescent mats have, heretofore, been known to generally contain one or more types of fibers selected from alumina/silica (available under the trademark FIBERFRAX from Unifrax Corporation, Niagara Falls, N.Y.), alumina/silica/magnesia (such as S2 Glass from Owens Corning, Toledo, Ohio).

Presently, fibers employed in state-of-the-art non-intumescent mounting mats for higher temperature applications are generally high in alumina content. For example, refractory ceramic fibers are composed substantially of alumina and silica and typically contain from about 45 to about 60 percent by weight alumina and from about 40 to about 55 percent by weight silica, while other alumina/silica ceramic fibers, such as alumina or mullite ceramic fibers made by sol gel processing, usually contain more than 50 percent alumina. S2-glass fibers typically contain from about 64 to about 66 percent silica, from about 24 to about 25 percent alumina, and from about 9 to about 10 percent magnesia. Generally, it has been thought that the higher the amount of alumina employed in the fibers, the higher temperature for the application in which the fibers could be employed. The use of fibers consisting substantially of alumina have therefore been proposed for this purpose.

To avoid the expense of using sol gel-derived, alumina-containing ceramic fibers, some manufacturers of mounting mats have resorted to an expensive preprocessing step such as stitch binding the material prior to installation of the mat. But such stitch binding techniques cannot be used in all catalytic converter applications. Other non-intumescent mounting mats are generally very thick and lack the structural integrity needed, and may even require being handled in a bag to prevent crumbling of the mounting mat. These mounting mats are also difficult to cut to size for installation, and further must be compressed substantially to fit enough material needed for supportive mounting within the gap between the catalyst support structure and the housing.

Attempts have been made to use still other types of materials in the production of non-intumescent mounting mats for catalytic converters and other exhaust gas-treating devices for high temperature applications. For example, U.S. Pat. No. 5,380,580 discloses a flexible, nonwoven mounting mat comprising shot-free ceramic oxide fibers comprising aluminosilicate fibers containing from about 60 to about 85 percent by weight alumina and from about 40 to about 15 percent by weight silica; crystalline quartz fibers; or both. The aluminosilicate fibers described have a higher alumina content than refractory ceramic fibers, but are produced using the sol gel techniques discussed above. On the other hand, crystalline quartz fibers are made of essentially pure silica (i.e., 99.9 percent silica). These fibers are made by a melt drawing process using raw materials derived from crystalline quartz, and are not leached in any manner. Such fibers are available from J. P. Stevens, Slater, N.Y., under the tradename ASTROQUARTZ, or from Saint Gobain, Louisville, Ky., under the tradename QUARTZEL. However, the cost of these quartz fibers make them commercially prohibitive for use in mounting mats.

Similarly, U.S. Pat. No. 5,290,522 discloses a nonwoven mounting mat for a catalytic converter that may contain magnesia/alumina/silicate fibers such as is known in the art and commercially available from Owens Corning, Toledo, Ohio as S2-GLASS, as well as the ASTROQUARTZ quartz fibers discussed in the above cited patent. In this patent, it is expressly noted in Comparative Example I that a mounting mat containing a commercially available leached glass fiber containing silica did not pass the hot shake test used by the patentees to determine suitability as a mounting mat for higher temperature catalytic converters.

Mounting mats containing silica fibers in combination with intumescent materials have been tested for catalytic converter use, for example in German Patent Publication No. 19858025.

A detailed description and process for making leached glass fibers high in silica content is contained in U.S. Pat. No. 2,624,658, the entire disclosure of which is incorporated herein by reference. Another process for making leached glass fibers high in silica content is disclosed in European Patent Application Publication No. 0973697. While both the U.S. Pat. and the European patent application publication disclose the production of leached silica fibers in the formation of high temperature resistant products made from the resultant fibers, there is no mention whatsoever of the fibers being suitable for use or even being capable of being used as mounting mats for exhaust gas treatment devices, such as catalytic converters.

SUMMARY

Broadly, melt-drawn, leached glass fibers high in silica content are used to form non-intumescent mounting mats for catalytic converters and other exhaust gas-treating devices. In certain embodiments, it has been found that heat treating the leached glass fibers containing silica or the mounting mats comprising them prior to being disposed within a catalytic converter further increases the holding pressure performance of the mounting mats.

In general, an exhaust gas treatment device is provided comprising a housing; a fragile structure resiliently mounted within the housing; and a non-intumescent mounting mat disposed in a gap between the housing and the fragile structure, wherein the mounting mat includes melt-formed, leached glass fibers containing at least 67 percent by weight silica and exerts a minimum holding pressure for holding the fragile structure within the housing of one of (i) at least about 10 kPa after 1000 cycles of testing at a hot face temperature of about 900° C., a gap bulk density of from about 0.3 to about 0.5 g/cm$^3$, and a percent gap expansion of about 5 percent, or (ii) at least about 50 kPa after 1000 cycles of testing at a hot face temperature of about 300° C., a gap bulk density of from about 0.3 to about 0.5 g/cm$^3$, and a percent gap expansion of about 2 percent.

Also provided is a method of making a device for treating exhaust gases, comprising providing a mounting mat comprising melt formed glass fibers containing silica, wherein the melt formed glass fibers are formed by treating the melt drawn glass fibers whereby the treated glass fibers have a silica content greater than the silica content of the glass fibers prior to being treated and whereby the treated glass fibers contain at least 67 percent by weight silica; wrapping the mounting mat around a fragile structure adapted for treating exhaust gases; and disposing the fragile structure and the mounting mat within a housing, whereby the mounting mat holds the fragile structure resiliently within the housing, and wherein the mounting mat exerts a minimum holding pressure for holding the fragile structure within the housing of one of (i) at least about 10 kPa after 1000 cycles of testing at a hot face temperature of about 900° C., a gap bulk density of from about 0.3 to about 0.5 g/cm$^3$, and a percent gap expansion of about 5%, or (ii) at least about 50 kPa after 1000 cycles of testing at a hot face temperature of about 300° C., a gap bulk density of from about 0.3 to about 0.5 g/cm$^3$, and a percent gap expansion of about 2 percent.

BRIEF DESCRIPTION OF THE DRAWING

The FIGURE is a fragmentary, elevational view of a catalytic converter containing a mounting mat according to the present invention.

DETAILED DESCRIPTION OF THE PREFERRED EMBODIMENTS

Figure 1:
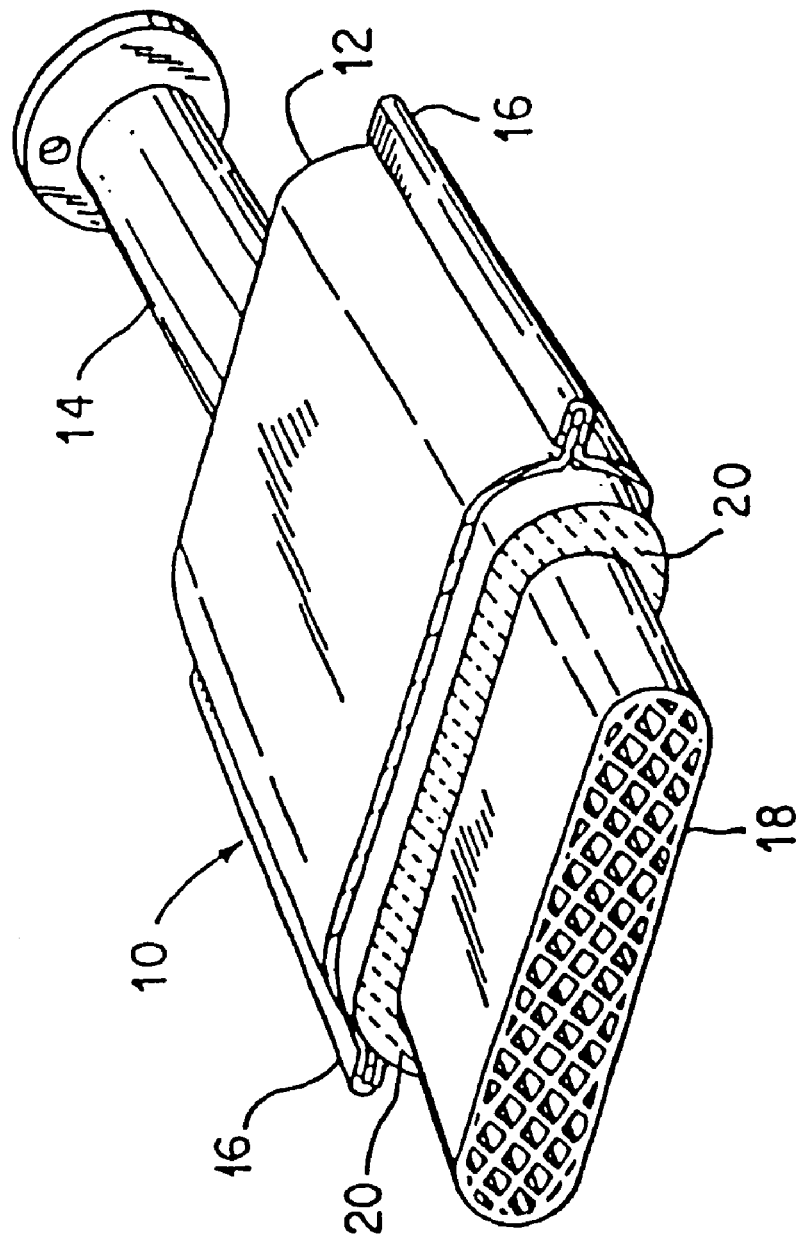

A device for treating exhaust gases is provided having a fragile structure mounted within a housing that is supported therein by a mounting mat disposed between the housing and the fragile structure. It will be understood that the present invention is not intended to be limited to use in the catalytic converter shown in the FIGURE, and so the shape is shown only as an example to illustrate the invention. In fact, the mounting mat could be used to mount or support any fragile structure suitable for treating exhaust gases, such as a diesel catalyst structure, a diesel particulate trap or the like. Catalyst structures generally include one or more porous tubular or honeycomb-like structures mounted by a thermally resistant material within a housing. Each structure may include anywhere from about 200 to about 900 or more channels or cells per square inch, depending upon the type of exhaust treating device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat of the present invention may include catalytic converters for chemical industry emission (exhaust) stacks. The term "fragile structure" is intended to mean and include structures such as metal or ceramic monoliths or the like which may be fragile or frangible in nature, and would benefit from a mounting mat such as is described herein.

One representative form of a device for treating exhaust gases is shown as a catalytic converter, generally designated by the numeral 10 in the FIGURE. Catalytic converter 10 may include a generally tubular housing 12 formed of two pieces of metal, e.g. high temperature resistant steel, held together by flange 16. Alternatively, the housing may include a preformed canister into which a mounting mat-wrapped catalyst support structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile catalyst support structure, such as a frangible ceramic monolith 18, which is supported and restrained within housing 12 by a mounting mat 20, to be further described. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

The monolith is spaced from its housing by a distance or a gap, which will vary according to the type and design of the device utilized, e.g., a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the catalyst support structure, protecting the fragile structure from mechanical shock.

In certain embodiments, the mounting mat 20 comprises one or more non-intumescent plies of melt-formed, amorphous, high-temperature resistant leached glass fibers having a high silica content and, optionally, includes a binder or other fibers suitable for acting as a binder. By the term "high silica content," it is meant that the fibers contain more silica than any other compositional ingredient in the fibers. In fact, as discussed below, it will be appreciated that the silica content of these fibers after leaching are preferably greater than any other glass fibers containing silica, including S-glass fibers, except crystalline quartz derived fibers or pure silica fibers.

The mounting mat is generally an integral, substantially non-expanding composite sheet or sheets of melt-formed leached glass fibers containing silica and optionally minor amounts of alumina and other non-siliceous oxides. By "melt-formed," it is meant that the fibers are created using melt processing techniques and are not formed from sol gel or other chemical dispersion techniques. By "integral," it is meant that, after manufacture and densification, the mounting mat has a self-supporting structure, needing no reinforcing or containment layers of fabric, plastic or paper, (including those which are stitch-bonded to the mat) and can be handled or manipulated without disintegration. The term "substantially non-expanding" is used as defined above. Hence, in one embodiment, it will be appreciated that the mounting mat is devoid of intumescent materials, sol gel-derived glass silica fibers and/or backing or reinforcing layers.

As noted above, the glass fibers are preferably treated to increase the silica content of the fibers. That is, when first melt processed and formed into fibers such as by melt drawing the fibers, these glass fibers typically include many non-siliceous oxides and other components. That is, they may have the characteristics of fiberglass, for example. They are not initially formed from pure silica fibers like the crystalline quartz derived fibers disclosed in U.S. Pat. Nos. 5,290,522 or 5,380,580. Instead, these "impure" glass fibers must be treated to remove the non-siliceous oxides such as alumina, sodium oxide, boron oxide, and any other water or acid soluble components present, thereby producing fibers of high silica content that is greater than the silica content of the glass fibers prior to being treated. The silica content of a resultant leached glass fiber depends upon the amount of non-siliceous oxides and other components initially present and the degree of extraction of these materials from the fibers.

Leaching is one preferred treatment for the glass fibers that will increase the silica content of the fibers. Glass fibers may be leached in any manner and using any techniques known in the art. Generally, leaching may be accomplished by subjecting the melt formed glass fibers to an acid solution or other solution suitable for extracting the non-siliceous oxides and other components from the fibers. As previously noted, a more detailed description of various known leaching techniques are discussed in U.S. Pat. No 2,624,658 and European Patent Application Publication No. 0973697, although these techniques are not limited to them.

The silica purity after leaching these glass fibers is much higher than prior to leaching. Generally, the leached glass fibers will have a silica content of at least 67 percent by weight. This is greater than the silica content of S-glass. More preferably, the leached glass fibers contains at least 90 percent by weight, and even more preferably, from about 90 percent by weight to less than 99 percent by weight silica. It will be appreciated that the high silica content of these fibers is greater than the known purity of any other known glass fibers containing silica, including S-glass fibers, except quartz fibers or pure silica fibers which contain greater than 99.9 percent silica.

In certain embodiments, the glass fibers will contain from about 93 to about 95 percent by weight silica, with the remainder of the fiber being non-siliceous oxides such as alumina, sodium oxide, and oxides of other alkali or alkaline earth metals. Amounts of alumina may preferably range from about 4 to about 6 percent by weight, while other ceramic oxides and components, including sodium oxides, generally comprise less than about 1 percent by weight of the leached glass fiber. In certain embodiments, it is preferred that that leached glass fibers contain less than 1 percent by weight alkali or alkaline earth metals. It will be understood that not all of the non-siliceous oxides need be removed from the leached glass fibers. However, the leached glass fibers require a silica content in excess of the alumina content and, more preferably, in excess of at least about 67 percent by weight. The fibers are also substantially shot free.

Importantly, these leached glass fibers are relatively inexpensive as compared to ceramic fibers such as high alumina fibers and particularly the above described crystalline quartz derived fibers. The average fiber diameter of these leached glass fibers is preferably greater than at least about 3.5 microns, and more preferably, greater than at least about 5 microns. On average, the glass fibers typically have a diameter of about 9 microns. An average fiber diameter of from about 5 to 14 microns is preferred. Thus, the leached glass fibers of the present invention are non-respirable.

The leached glass fibers may be provided in any form commonly used in the production of mounting mats. In certain embodiments, these fibers are chopped tow fibers. Prior to leaching, it will be appreciated that the fibers can be produced by any method known in the art, but are typically formed using known melt processing techniques such as either by melt spinning or melt drawing in a manner which will provide a cost effective approach to the production of the fibers. In certain embodiments, the glass fibers are melt drawn.

Examples of leached glass fibers high in silica content and suitable for use in the production of a mounting mat for a catalytic converter or other known gas-treating device include those leached glass fibers available from BelChem Fiber Materials GmbH, Germany, under the trademark BELCOTEX and from Hitco Carbon Composites, Inc. of Gardena Calif., under the registered trademark REFRASIL. The BELCOTEX fibers are standard type, staple fiber pre-yarns. These fibers have an average fineness of about 550 tex and are generally made from silicic acid modified by alumina. The BELCOTEX fibers generally contain about 94.5 silica, about 4.5 percent alumina, less than 0.5 percent sodium oxide, and less than 0.5 percent of other components. They have an average fiber diameter of about 9 microns and a melting point in the range of 1500 to 1550° C. These fibers are heat resistant to temperatures of up to 1100° C., and are typically shot free and binder free.

The REFRASIL fibers, like the BELCOTEX fibers, are amorphous leached glass fibers high in silica content for providing thermal insulation for applications in the 1000 to 1100° C. range. These fibers are between about 6 and about 13 microns in diameter, and have a melting point of about 1700° C. The fibers, after leaching, typically have a silica content of about 95 percent by weight. Alumina is present in an amount of about 4 percent by weight with other components being present in an amount of 1 percent or less.

The leached glass fibers that are useful as the mounting mat for exhaust gas treatment devices such as catalytic converters are melt-formed fibers high in silica content. It is believed that no catalytic converter mounting mat has ever been commercially made substantially from leached glass fibers. Where leached glass fibers may have been tested, they have either failed to maintain a sufficient and effective minimum holding pressure upon thermal cycling to be useful as a mounting mat in an exhaust gas-treatment device or have been used with substantial amounts of other materials, such as intumescent materials, which aided in providing a sufficient and effective residual holding pressure for the mounting mat.

Leached glass fibers made into mat form have typically been found to provide less strength to the mat. That is, leaching of non-siliceous materials, including alumina, from glass fibers will predictably lower the holding force of a mat to the extent that the mat will have less shear strength. While it may be possible for a mounting mat comprising leached glass fibers containing silica to initially provide an adequate minimum holding pressure for holding a fragile structure within a housing of a catalytic converter, mechanical or thermal cycling of the mat will quickly destroy its ability to maintain that minimum holding pressure. Thus, one would be led away from using leached glass fibers high in silica content in the production of a catalytic converter mounting mat. This fact is confirmed in U.S. Pat. No. 5,290,522.

However, we have found that by further treating either the leached glass fibers prior to formation of the mounting mat, or mounting mats made from these fibers after formation, the holding pressure performance of the mounting mats can be improved sufficiently, even after cycling, to be adaptable for use in an exhaust gas treatment device. Without this additional treatment, however, a mounting mat comprising these leached glass fibers does not maintain a minimum holding pressure sufficient to hold the fragile structure within the housing of the exhaust gas treatment device after undergoing thermal cycling.

It has been surprisingly found that heat treating the fibers provides significantly higher holding pressure performance, particularly with respect to high temperature applications, although higher holding pressure is also achieved for lower temperature applications as well. In one particular embodiment, these leached glass fibers (or the mounting mats containing them) may be heat treated at temperatures ranging from above at least about 900° C., preferably from about 900° C. to about 1100° C., such that the mounting mat employing these fibers may exert the minimum required holding pressure within the exhaust gas treatment device, even after 1000 cycles of expansion and contraction. Heretofore, upon heat treatment of these fibers, one would not have expected the mounting mat to maintain an effective minimum holding pressure after thermal cycling.

It has been found that heat treating the high silica fibers improved many of the fibers' physical properties as well. For instance, it is believed that the creep resistance of the fibers is increased, as well as the surface area of the fibers. Without being bound by theory, it is believed that heat treating the already leached glass fibers "pre-shrinks" the fibers. Low shrinkage is also known to contribute to good creep resistance. It is also believed that heat treating the fibers removes additional aqueous components out of the fibers, thereby providing increased surface area. Thus, the use of leached glass silica fibers, particularly treated leached glass silica fibers, allows for the production of a mounting mat having all of the excellent physical characteristics of fiberglass, but suitable for higher temperature applications, well beyond the melting point of fiberglass.

Heat treatment of the leached glass fibers may take place prior to formation of the mounting mat or after formation of the mounting mat. When heat treated after formation of the mounting mat, the mounting mat is heat treated at a temperature of at least 900° C. for an effective period of time to meet or exceed the desired effective minimum holding pressure for holding the fragile structure within the housing for the application. Similarly, when heat treated prior to formation of the mounting mat, the leached glass fibers may preferably be heated to a temperature of at least 900° C. for an effective period of time such that, when formed into the mounting mat, the minimum holding pressure for holding the fragile structure within the housing is met. The particular amount of time for heat treating may vary widely depending upon, among other things, the thickness of the mat, the uniformity of the heating, type of heating source used, the ramp up time and temperature of the heating source, etc. All of these variables are well understood by those skilled in the art, so an effective period of time for heating at a temperature of 900° C. or above may be readily determined without undue experimentation.

Generally, it has been recognized that heat treatment may take anywhere from 15 minutes or less, where relatively small, thin mats and excellent and uniform heat sources are used, to more than 1 hour where larger, thicker mats are employed (not including temperature ramp up and ramp down time). In certain embodiments, the mounting mat or leached glass fibers are heated at a temperature of between about 900° C. and 1100° C. for greater than 1 hour. It will further be appreciated that heat treatment may alternatively be conducted by subjecting the leached glass fibers and/or mounting mats made therefrom to lower heating temperatures, such as 300° C. However, the length of time necessary for obtaining a satisfactory mounting mat having the desired effective holding pressure is seen as commercially infeasible if the heat treatment takes longer than 24 hours. Heat treating under any time and temperature regimen below the time and/or temperature resulting in devitrification of the fibers, to achieve the same beneficial effects outlined above, would fall within the scope of the invention. Generally, the fibers or mat may be heat treated at or above the intended use temperature. It is noted that heat treating at lower temperatures may affect the usefulness of the mounting mat in applications requiring thermal cycling at temperatures substantially above the heat treatment temperature.

Other methods may be used to treat the leached glass fibers for use in the mounting mat in order to maintain a minimum holding pressure for holding the fragile structure within the housing for example, an ion exchange process or a diffusion process to increase the creep resistance of the fibers. However, it will be understood that essentially any method by which one can treat the leached glass fibers or the mounting mat so as to maintain a minimum holding pressure for the mat for holding the fragile structure within the housing after thermal cycling, may be used.

The mounting mat preferably employs up to 100 percent by weight leached glass fibers containing silica. However, in other embodiments, the mat may optionally comprise other known fibers such as alumina/silica fibers, or other ceramic or glass fibers suitable for use in the production of mounting mats for the particular temperature applications desired. Thus, alumina/silica fibers such as refractory ceramic fibers may be optionally employed for high temperature or wide ranging temperature applications. Other ceramic or glass fibers such as S-glass may be used with the leached glass silica fibers in similar or lower temperature applications. In such instances, however, the mounting mat preferably includes at least 50 percent by weight of leached glass fibers containing silica. In other words, the majority of the fiber utilized in the production of the mat will be leached glass fibers containing silica, and in a more preferred embodiment, at least 80 percent by weight of the fibers will be leached glass fibers containing silica.

In certain alternative embodiments, fibers such as S2-glass and the like may be added to the mounting mat in quantities of from greater than 0 to about 50 percent by weight, based upon 100 percent by weight of the total mat. It is envisioned that these glass fibers will be used mainly in low temperature applications due to their melting temperatures and the like.

In other alternative embodiments, the mounting mat may include refractory ceramic fibers in addition to the leached glass fibers. When refractory ceramic fibers, that is, alumina/silica fibers or the like are utilized, they may be present in an amount ranging from greater than 0 to less than about 50 percent by weight, based upon 100 percent by weight of the total mat.

As noted previously, the mounting mats may or may not include a binder. When a binder is used, the components are mixed to form a mixture or slurry. The slurry of fibers and binder is then formed into a mat structure and the binder is removed, thereby providing a mounting mat containing substantially only the heat-treated fibers (and optionally additional fibers). Typically, a sacrificial binder is employed to initially bond the fibers together. The binders used are typically organic binders. By "sacrificial," it is meant that the binder will eventually be burned out of the mounting mat, leaving only the leached glass fibers (and other ceramic or glass fibers, if used) as the mounting mat for supporting the fragile structure.

Suitable binders include aqueous and nonaqueous binders, but preferably the binder utilized is a reactive, thermally setting latex, which after cure is a flexible material that can be burned out of an installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Preferably, about 5 to about 10 percent latex is employed, with about 8 percent being most preferred. Solvents for the binders can include water, or a suitable organic solvent, such as acetone, for the binder utilized. Solution strength of the binder in the solvent (if used) can be determined by conventional methods based on the binder loading desired and the workability of the binder system (viscosity, solids content, etc.).

Instead of binder, the mat may include other fibers in addition to the leached glass fibers to hold the mat together. These fibers may be used in amounts ranging from greater than 0 to about 20 percent by weight, based upon 100 percent by weight of the total composition, to aid in binding the leached glass fibers together.

The mounting mat containing the leached glass silica containing fibers can be prepared by any known techniques commonly used in the preparation of mounting mats. For instance, using a papermaking process, the leached glass fibers may be mixed with a binder or other fibers capable of acting as a binder to form a mixture or slurry. Any mixing means may be used, but preferably, when a binder is used, the fibrous components are mixed at about a 0.25% to 5% consistency or solids content (0.25–5 parts solids to 99.75–95 parts water). The slurry may then be diluted with water to enhance formation, and it may finally be flocculated with a flocculating agent and drainage retention aid chemicals. Then, the flocculated mixture or slurry may be placed onto a papermaking machine to be formed into a ply of fiber containing paper. Alternatively, the plies may be formed by vacuum casting the slurry. In either case, they are typically dried in ovens. For a more detailed description of the standard papermaking techniques employed, see U.S. Pat. No. 3,458,329, the disclosure of which is incorporated herein by reference. It will be appreciated that when a binder is employed and the leached glass fibers are to be heat treated, the step of heat treating the fibers should be performed prior to adding the binder or binding fibers to the leached glass fibers.

In other embodiments, the leached glass fibers may be processed into a mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength. Heat treatment of the fibers may occur prior to formation of the mat or after the mat is needled.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect to the conventional papermaking technique. This method of preparing the mat aids in maintaining fiber length by reducing breakage. It will be appreciated, however, that heat treatment, may occur prior to addition of any binder.

Methods of impregnation of the mat with the binder include complete submersion of the mat in a liquid binder system, or alternatively spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size It is noted that mounting mats produced from these leached glass fibers may be too low in density for easy use in certain catalytic converter applications. Therefore, they should preferably undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mounting mat of the correct and desired form.

Regardless of which of the above-described techniques are employed, the composite can be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the catalyst support structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

Further, and surprisingly, the inventive mounting mat has been found to be capable of maintaining a minimum holding pressure of at least 50 kPa after undergoing 1000 mechanical cycles of a standard 1000 cycle gap expansion test conducted at a hot face temperature of about 300° C., with a mat gap bulk density of from about 0.3 to about 0.5 g/cm$^3$, and a percent gap expansion of about 2 percent. It will be appreciated that this test is particularly suited for mounting mats to be used in holding heavier substrates in high G load applications in low temperature applications. Exhaust gas treatment devices for such applications include diesel catalyst structures and diesel particulate traps. For high temperature applications, such as are common for catalytic converters, the mounting mat has been found to be capable of maintaining a minimum holding pressure of at least 10 kPa after undergoing 1000 mechanical cycles of a standard 1000 cycle gap expansion test conducted at a hot face temperature of about 900° C., with a mat gap bulk density of from about 0.3 to about 0.5 g/cm$^3$, and a percent gap expansion of about 5 percent.

By the term "cycle" it is meant that the gap between the monolith (i.e., fragile structure) and housing is opened and closed over a specific distance and at a predetermined rate. In order to simulate realistic conditions, the expansion of the gap between a housing and a fragile structure of a given diameter may be determined by calculating the coefficient of thermal expansion of a conventional housing at a temperature of, for example, about 900° C. A final mat basis weight is then selected that will meet the criteria of the test, and provide a minimum holding force (Pmin) of greater than about 10 kPa after 1000 cycles. The goal is to provide adequate support at the lowest cost, so the minimum basis weight that satisfies the greater than about 10 kPa requirement is selected. While certain prior art non-intumescent mounting mats may also have the capability of maintaining a "high" minimum pressure after 1000 cycles at a hot face temperature of at least about 900° C., those mats uniformly contain very expensive, sol gel derived ceramic fibers having a high alumina content of at least 30 percent or higher, or crystalline quartz derived fibers, or both. The prior art non-intumescent mats do not contain leached glass fibers having greater than about 67 percent silica.

In operation, the catalytic converter experiences a significant change in temperature. Due to the differences in their thermal expansion coefficients, the housing may expand more than the support structure 18, such that the gap between these elements will increase slightly. In a typical case, the gap may expand and contract on the order of about 0.25 to about 50 mm during thermal cycling of the converter. The thickness and mounting density of the mounting mat is selected such that a minimum holding pressure of at least about 10 kPa is maintained under all conditions to prevent the fragile structure from vibrating loose. The mounting pressure exerted by the mounting mat 20 under these conditions permits accommodation of the thermal characteristics of the assembly without compromising the physical integrity of the constituent elements.

For mounting mats to be used in lower temperature applications, testing is conducted at about 300° C. However, the testing is conducted in the same manner as the high temperature test described. However, given the differences in load applications and the fact that heavier catalyst structures are often used, the minimum holding pressure must be higher. Therefore, as noted above, the mat must provide a holding pressure against the fragile structure of at least 50 kPa after 1000 cycles of testing at a hot face temperature of about 300° C.

Having described the invention in general terms, it is now illustrated in greater detail by way of examples. It will be understood that these examples are for illustration only and should not be considered limiting in any respect, unless otherwise stated. These examples are used to demonstrate practice of the invention only.

In order to demonstrate practice of the invention, BELCOTEX leached glass silica fiber was heat treated for 2 hours at temperatures between about 900° C. and 1100° C. The heat treated fibers were then mixed with about 6.5 percent by weight of a fiber suitable for binding the leached glass silica fibers together upon heating. The combined fibers were then wet laid into the form of a mat. The mat was dried in an oven at a temperature of about 60° C. The dried mat was then heat pressed to a density of about 148 kg/m$^3$. The pressed mat was produced in a suitable final form for use as a mounting mat in a catalytic converter application.

In another embodiment, the invention was demonstrated by first wet laying the leached glass silica fibers in a mat. The mat was then needle punched to achieve a density of about 148 kg/m$^3$. The needled mat was then heat treated for 2 hours between about 900° C. and 1100° C. Upon being removed from the heat treatment, the mat was in its final product form for use as a mounting mat in a catalytic converter application.

Other mounting mats comprising leached glass silica fibers obtained from other manufacturers were also produced using essentially one of methods described above, with the mat or fibers being heat treated to temperatures of at least about 900° C. For comparison purposes, sample mats containing leached glass fibers high in silica content were produced, but no heat treatment of the fibers or mats were conducted. These mats are considered to be in an "as is" state.

In at least one instance, a "pre-shrunk" leached glass silica fiber blanket was tested. This fiber blanket is commercially available for various applications but has never been tested or suggested as suitable for use as a mounting mat for exhaust gas treatment devices. By "pre-shrunk," it is meant that the leached glass silica fibers have already undergone further processing to lower shrinkage of the blanket. There are a number of applications where a fiber blanket should desirably maintain its form and not shrink upon use in high temperature applications.

Each mat was subjected to high temperature (900° C.) 1000 cycle gap expansion testing. The testing conditions consisted of a set of constant parameters that were utilized to compare the sample mats. These tests parameters included three different hot face temperatures of 300° C., 600° C. and 900° C., a gap bulk density of 0.3 g/cm$^3$, and a percent gap expansion of about 5 percent. Given these parameters and the known basis weight of the mounting mats, a gap of 2.9 to 5.45 mm was employed in this test to effect a 0.3 g/cm$^3$ gap bulk density. For the low temperature (300°) 1000 cycle test, a gap of 4.13 mm and a gap expansion of about 2 percent was used.

It will be appreciated that one of ordinary skill in the art will be able to conduct this 1000 cycle test employing these parameters without undue experimentation. That is, the above set parameters will enable one of ordinary skill in the art to make a like comparison of the effective holding pressure of a mat regardless of the characteristics of the mat or the size of the gap. For the particular mats tested here, a gap size of 2.9 to 5.45 mm was deemed appropriate based upon the known characteristics of the mat such as basis weight and other set parameters such as gap bulk density. It will also be understood that the gap bulk density of the mounting mat may be varied depending upon the application. It is possible that an acceptable minimum holding pressure may not be attained at a lower gap bulk density such as 0.3 g/cm$^3$ but may still be attained at a higher gap bulk density, such as 0.5 g/cm$^3$, for some applications. Therefore, the test may be completed using any gap bulk density appropriate for the application, generally falling within the range of from about 0.3 to 0.5 g/cm$^3$.

The results of these tests are shown in Table I below.

TABLE I

1000 Cycle Gap Expansion Test Results (In kPa)

| Example No./ Test | 1 As Is | 2 Heat Treated | 3 As Is | 4 Pre-shrunk | 5 Heat Treated | 6 As Is | 7 Heat Treated |
|---|---|---|---|---|---|---|---|
| Pmin 1000@ 0.3 GBD & 300° C. | 7.93 | 124 | 14.73 | 63.16 | 98.43 | 12.4 | 122.06 |
| Pmin 1000 @ 0.3 GBD & 900° C. | 2.00 | 98.79 | 4.07 | 39.71 | 29.44 | 2.41 | 41.36 |
| Pfixed Gap @ 0.3 GBD & 300° C. | 24.82 | 264.04 | 21.71 | 114.44 | 110.10 | 34.88 | 89.14 |
| Pfixed Gap @ 0.3 GBD & 600° C. | 6.98 | 259.01 | 10.86 | 122.09 | 114.72 | 11.72 | 81.42 |
| Pfixed Gap @ 0.3 GBD & 900° C. | 7.75 | 253.56 | 8.14 | 126.37 | 115.54 | 7.72 | 97.69 |

Upon review of the results, it will be appreciated that all treated, leached glass fiber mats began with a holding pressure well above the minimum holding pressure required for both high temperature (i.e., Pmin=10 kPa) and low temperature (i.e. Pmin=50 kPa) applications upon initial testing at 300° C., 600° C. and 900° C. (Pfixed Gap results.) However, the "as is" leached glass silica fiber mats did not maintain an adequate holding pressure upon initial cycling, let alone after 1000 cycles. In comparison, the mats employing treated, leached glass fibers all maintained an effective holding pressure or load (Pmin) after the 1000th cycle in the test above the required minimum. For the high temperature applications, it will be appreciated that the lowest effective holding pressure (Pmin) for the treated fibers was about 29 kPa after 1000 cycles at 900° C., well above the 10 kPa minimum.

In light of the outstanding 1000 cycle gap expansion test results demonstrated by the non-intumescent mounting mats for the exhaust gas treatment devices of the present invention and the relatively low cost associated with the production of leached glass fibers containing silica as compared to sol gel ceramic fibers or crystalline quartz derived fibers, these mats are advantageous to the catalytic converter and diesel particulate trap industry. The mounting mats can be die cut and are operable as resilient supports in a thin profile, providing ease of handling, and in a flexible form, so as to be able to provide a total wrap of the catalyst support structure, if desired, without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperatures of from about 20° C. to at least about 1100° C., including during thermal cycling.

The mounting mats described above can also be used in catalytic converters employed in the chemical industry which are located within exhaust or emission stacks, including those which contain fragile honeycomb type structures that need to be protectively mounted.

The present invention is not limited to the specific embodiments described above, but includes variations, modifications and equivalent embodiments defined by the following claims. The embodiments described above are not necessarily in the alternative, as various embodiments may be combined to provide the desired characteristics.

We claim:

1. A device for treatment of exhaust gases comprising:
    a housing;
    a fragile structure resiliently mounted within said housing; and
    a non-intumescent mounting mat disposed in a gap between said housing and said fragile structure, wherein said mounting mat includes melt-formed, leached, and heat treated glass fibers containing at least 67 percent by weight silica wherein said mounting mat exerts a minimum holding pressure for holding said fragile structure within said housing of one of (i) at least about 10 kPa after 1000 cycles of testing at a hot face temperature of about 900° C., a gap bulk density of from about 0.3 to about 0.5 g/cm$^3$, and a percent gap expansion of about 5 percent, or (ii) at least about 50 kPa after 1000 cycles of testing at a hot face temperature of about 300° C., a gap bulk density of from about 0.3 to about 0.5 g/cm$^3$, and a percent gap expansion of about 2 percent.

2. The device of claim 1, wherein said housing has an inlet at one end and an outlet at an opposite end through which exhaust gases flow; and wherein said fragile structure has an outer surface, an inlet end surface at one end in communication with said inlet of said housing and an outlet end surface at an opposite end in communication with said outlet end of said housing.

3. The device of claim 1, wherein said mounting mat comprises at least one integral, substantially non-expanding ply comprising melt-drawn, leached glass fibers containing silica.

4. The device of claim 1, wherein said leached glass fibers contain at least 90 percent by weight silica.

5. The device of claim 1, wherein said leached glass fibers contain from about 90 to less than 99 percent by weight silica.

6. The device of claim 1, wherein said leached glass fibers contain from about 93 to about 95 percent by weight silica and from about 4 to about 6 percent by weight alumina.

7. The device of claim 1, wherein said leached glass fibers contain less than about 1 percent by weight alkali or alkaline earth metals.

8. The device of claim 1, wherein said mounting mat comprises from about 50 to 100 percent by weight of said leached glass fibers.

9. The device of claim 1, wherein said mounting mat comprises at least 80 percent by weight of said leached glass fibers.

10. The device of claim 1, wherein the mounting mat is substantially free of binder.

11. The device of claim 1, wherein the leached glass fibers have a diameter greater than 3.5 microns.

12. The device of claim 1, wherein the leached glass fibers have a diameter greater than 5 microns.

13. The device of claim 1, wherein the leached glass fibers are melt drawn.

14. The device of claim 1, wherein the leached glass fibers are substantially shot free.

15. The device of claim 1, wherein the mounting mat contains greater than 0 to about 50 weight percent, based upon 100 percent by weight of the total mat, of S2-glass fibers or refractory ceramic fibers.

16. The device of claim 1, wherein the mounting mat is heat treated at a temperature of at least about 900° C. for an effective period of time to meet the effective minimum holding pressure for holding the fragile structure within the housing.

17. The device of claim 1, wherein the leached glass fibers prior to the formation of the mounting mat are heat treated at a temperature of at least about 900° C. for an effective period of time such that the leached glass fibers, when formed into the mounting mat, meet the minimum holding pressure for holding the fragile structure within the housing.

18. The device of claim 1, wherein the device is a catalytic converter or diesel particulate trap.

19. A method of making a device for treating exhaust gases, comprising:
providing a mounting mat comprising melt-formed glass fibers containing silica, wherein the melt-formed glass fibers are formed by
treating the melt-formed glass fibers whereby the treated glass fibers have a silica content greater than the silica content of the glass fibers prior to being treated and whereby the treated glass fibers contain at least 67 percent by weight silica;
heat treating the leached glass fibers prior to formation of the mounting mat, or heat treating the mounting mat, prior to wrapping the fragile structure;
wrapping the mounting mat around a fragile structure adapted for treating exhaust gases; and
disposing the fragile structure and the mounting mat within a housing, whereby the mounting mat holds the fragile structure resiliently within the housing, and wherein the mounting mat exerts a minimum holding pressure for holding said fragile structure within said housing of one of (i) at least about 10 kPa after 1000 cycles of testing at a hot face temperature of about 900° C., a gap bulk density of from about 0.3 to about 0.5 g/cm$^3$, and a percent gap expansion of about 5 percent, or (ii) at least about 50 kPa after 1000 cycles of testing at a hot face temperature of about 300° C., a gap bulk density of from about 0.3 to about 0.5 g/cm$^3$, and a percent gap expansion of about 2 percent.

20. The method of claim 19, wherein the step of treating the melt drawn glass fibers includes leaching the glass fibers in an acid solution.

21. The method of claim 19, wherein the step of heat treating comprises heating the fibers or mounting mat at a temperature between about 900° C. and about 1100° C., for greater than 1 hour.

22. The method of claim 19, wherein the step of heat treating comprises heating the fibers or mounting mat at a temperature of at least about 900° C. for an effective period of time to meet the effective minimum holding pressure for holding the fragile structure within the housing.

* * * * *